Sept. 2, 1924.  A. E. LOGAN  1,506,911
WHEEL RIM
Filed July 10, 1922
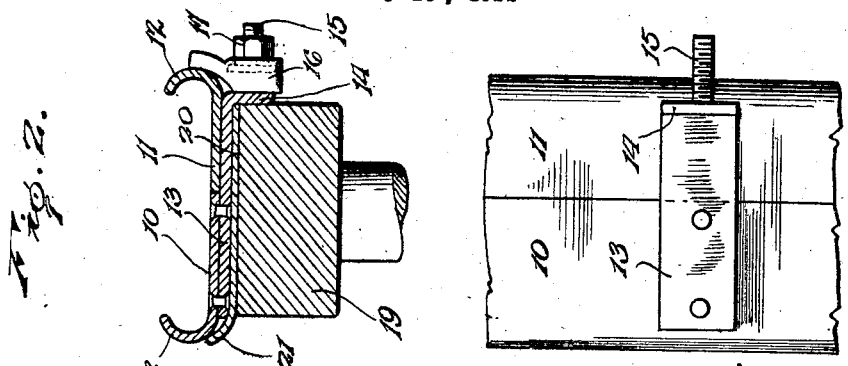
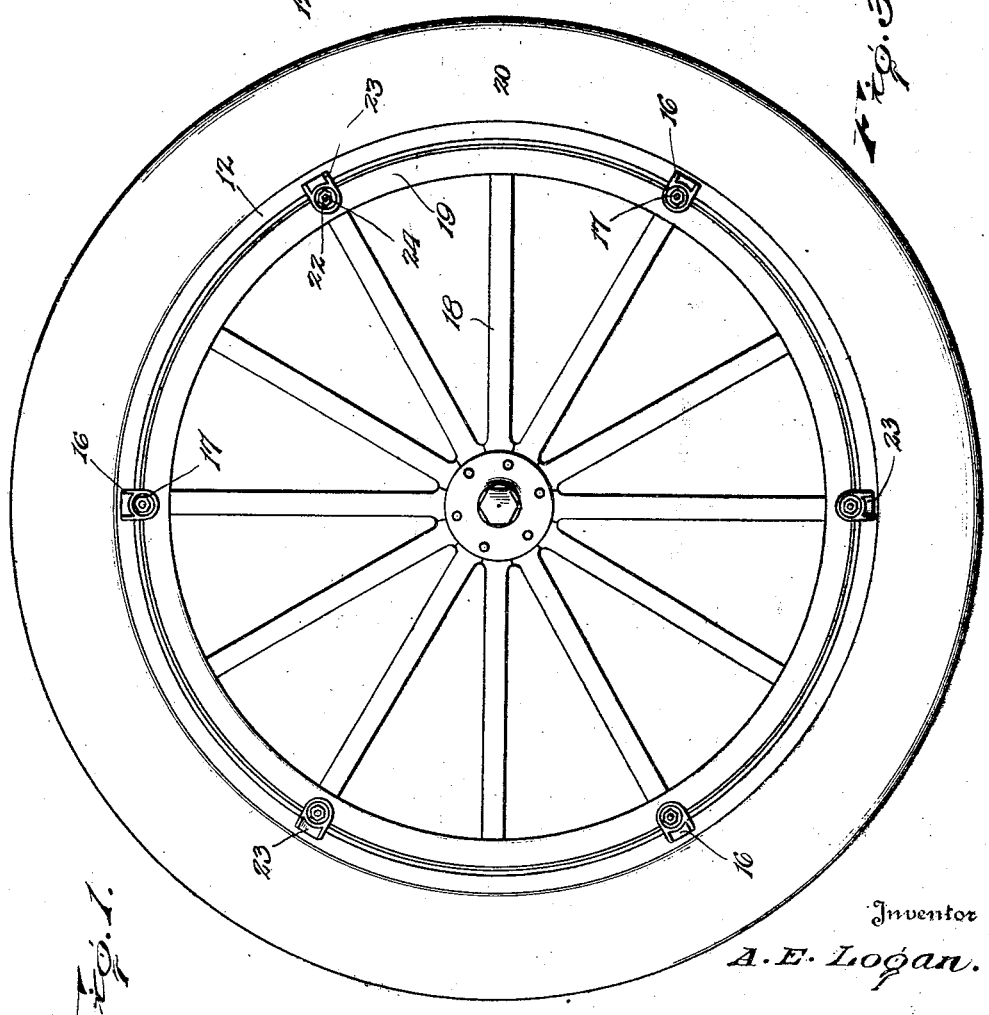
Inventor
A. E. Logan.
By
Lacy & Lacy, Attorneys Patented Sept. 2, 1924.

1,506,911

UNITED STATES PATENT OFFICE.

ALBERT E. LOGAN, OF BROOKLYN, NEW YORK.

WHEEL RIM.

Application filed July 10, 1922. Serial No. 573,948.

*To all whom it may concern:*

Be it known that I, ALBERT E. LOGAN, citizen of the United States, residing at Brooklyn, in the county of Kings and State of New York, have invented certain new and useful Improvements in Wheel Rims, of which the following is a specification.

This invention relates to an improved rim for motor vehicle wheels and seeks, as one of its principal objects, to provide a rim of such construction that a tire may be removed from or placed upon the rim with a minimum of difficulty.

The invention has as a further object to provide a rim embodying companion annular rim sections and wherein said sections may be readily separated to free a tire upon the rim.

Another object of the invention is to provide a rim wherein the rim sections may be securely clamped in mating relation for supporting a tire thereon.

And the invention has as a still further object to provide a rim wherein the clamps employed for securing the rim sections together will be disposed to engage a wheel felly to coact between the felly and the removable section of the rim.

Other and incidental objects will appear hereinafter.

In the drawing:

Figure 1 is a side elevation showing a conventional motor vehicle wheel equipped with my improved rim, an ordinary tire being shown upon the rim, Figure 2 is a transverse sectional view showing the manner in which the sections of the rim are clamped together, and Figure 3 is a fragmentary bottom plan view particularly showing one of the cleats of the rim.

In carrying the invention into effect, I employ a rim body which is split circumferentially at its base to provide mating rim sections 10 and 11 respectively. Each of said sections carries a side flange 12 to coact with a tire and, in this connection, it is to be noted that the rim may be either of the straight side or clincher type. The rim section 10 is preferably wider than the rim section 11 and mounted upon the base portion of the section 10 at its inner side is a plurality of circumferentially spaced transversely disposed cleats 13. These cleats are riveted or otherwise secured to the rim section and, of course, any approved number of said cleats may be employed. The cleats are straight and flat to project from the section 10 of the rim body beneath the section 11 thereof supporting the latter section to abut at its inner edge against the inner edge of the section 10, and formed on the outer ends of the cleats are depending lugs 14 directed radially inward with respect to the rim body. Integrally formed on or otherwise secured to said lugs are laterally projecting studs 15 and freely fitting over said studs are clamps 16 coacting between said lugs and the rim section 11. Swiveled upon said clamps are nuts 17 threaded upon the studs binding the rim sections together.

In Figure 1 of the drawing, I have shown my improved rim in connection with a conventional motor vehicle wheel 18 having the usual felly 19. Surrounding the felly is a felly band 20 having a side flange 21 and, as will now be observed, the rim body is formed to surround the felly, supported in spaced relation thereto by the cleats 13. The cleats 13 lie flat against the felly band and are of such length that the lugs 14 of said cleats abut one side face of the felly limiting the rim body in engagement with the flange 21 of said band. Extending through the felly are bolts 22 upon which are clamps 23 held by nuts 24 to coact with the rim removably securing the rim upon the wheel.

As will now be at once understood in view of the preceding description, by removing the nuts 24 and clamps 23 the rim may be displaced from the wheel when, by removing the nuts 17 and clamps 16 the section 11 of the rim body may be readily separated from the section 10 thereof to release the tire. Thus, the tire may be easily taken off. Conversely, the tire may be fitted around the rim section 10 when the rim section 11 may then be assembled with the section 10 and the rim applied to the wheel. I accordingly provide a rim wherein the tire may be removed from the rim or replaced thereon without difficulty.

Having thus described the invention, what is claimed as new is:

In a demountable rim, the combination of a rim body having side flanges and circumferentially split medially to define mating rim sections of substantially equal width, said sections having straight abutting inner edges forming a smooth closed joint approximately midway between said flanges whereby said joint will be disposed between the beads of a tire upon the rim, transversely disposed cleats secured to the inner face of one of said sections to extend across the inner circumference of the other of said sections in flat contact with the inner face thereof centering the sections in registering relation and provided at their outer ends with inwardly directed radial lugs, studs permanently fixed to said lugs, clamps freely received on said studs to engage the side flange of the latter section, and nuts adjustable upon the studs to coact with the clamps for binding the rim sections together, the cleats extending transversely of the sections throughout the major portion of the combined width thereof for sustaining the rim with respect to a wheel felly.

In testimony whereof I affix my signature.

ALBERT E. LOGAN. [L. S.]